June 30, 1953  W. M. WISE  2,643,873
HYDRAULIC WEIGHING SCALE AND METHOD OF
CHARGING AND CONDITIONING THE SAME
Filed Jan. 19, 1950
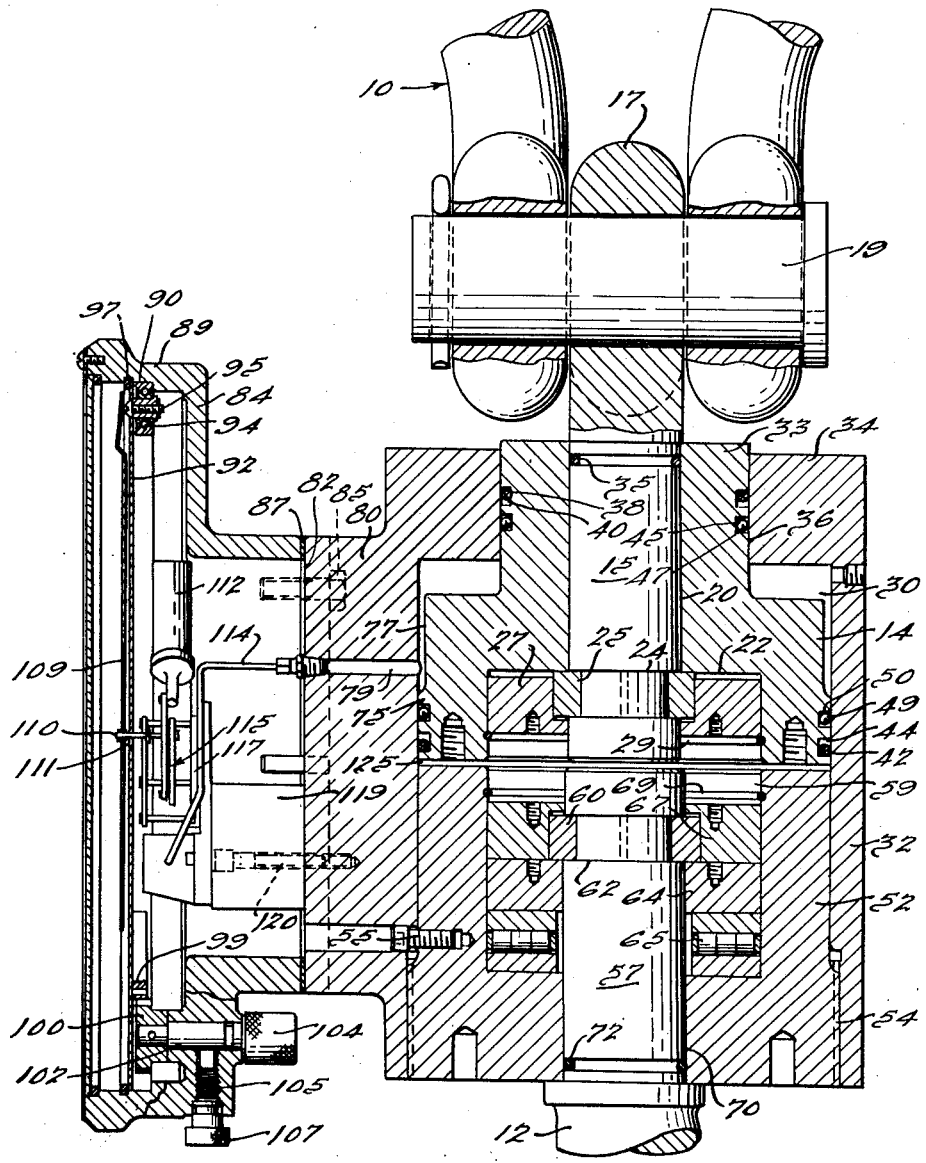
INVENTOR.
William M. Wise.
BY
Harness, Dickey & Pierce.
ATTORNEYS.

Patented June 30, 1953

2,643,873

UNITED STATES PATENT OFFICE 2,643,873

HYDRAULIC WEIGHING SCALE AND METHOD OF CHARGING AND CONDITIONING THE SAME

William M. Wise, Royal Oak, Mich.

Application January 19, 1950, Serial No. 139,446

7 Claims. (Cl. 265—47)

The present invention relates to hydraulic weighing scales and to methods of construction thereof, and constitutes a further development of the invention disclosed in my copending application Serial No. 25,006.

An important object of the invention is to provide an improved hydraulic weighing scale of extremely compact, rugged and simple construction, of high accuracy and sensitivity, and which is so constructed and arranged that the high sensitivity and accuracy thereof is maintained in the vicinity of the zero reading of the scale, as well as under substantial loads, so that the indicating pointer will always return quickly and accurately to the exact zero (or tare-set) position, when a load is removed.

Another object of the present invention is to provide an improved method of assembling, charging and conditioning hydraulic weighing scales, and improved structural features related to such novel method, the structural features and method being so interrelated that parts which move during loading and unloading of the scale impose minimum friction, yet a tight and effective seal is maintained at all time to prevent leakage of the hydraulic fluid.

Other objects and advantages of the invention will become apparent upon consideration of the present disclosure in its entirety.

The single figure of drawing shows in substantially central vertical section a hydraulic weighing scale constructed in accordance with the principles of the present invention, portions of the lifting eye and load-supporting hook being broken away.

Referring now to the drawing, reference character 10 designates generally a lifting eye which is adapted to be attached to a crane, hoist or other suitable lifting or supporting element, and reference character 12 designates a load-supporting hook, which is only fragmentarily shown and to which the load to be weighed is adapted to be attached. It will be understood that the portions 10, 12 are merely illustrative of suitable means for loading the scale mechanism.

The eye 10 carries a piston 14, which is attached thereto by an axial pin 15. The upper end of the pin projects above the piston and is formed as an eye 17 mounted upon a clevis pin 19, which extends through the suitably apertured bifurcated lower end portions of the eye 10, the eye 10 being shown formed as a clevis although this will be recognized as subject to variation. The piston is shown as formed with an axial hole 20 through which the stem of the pin 15 extends and with an enlarged counterbored chamber 22 at its lower end into which the lower end of the pin projects, and within which chamber the stem of the pin is provided with a peripheral groove 24 for a split shear ring 25 which rigidly but rotatably secures the pin with respect to the piston. Downward movement of the pin with respect to the piston is limited by a collar 27 fitted in the counterbored portion 22 and retained therein by a snap ring 29.

The piston is slidably fitted in a cylinder 30 formed in the casing 32. At its upper end, the piston is formed with a reduced neck 33 slidably fitted in the upper cylinder head wall 34. The pin 15 is sealed with respect to the bore 20 by a resilient toroidal gasket or so-called O-ring 35, and the neck 33 is similarly sealed with respect to the bore 36 in the cylinder head 34 by a like gasket ring 38 fitted in an axially elongated peripheral groove 40. The skirt of the piston is similarly sealed with respect to the cylinder wall by an O-ring 42 fitted in an axially elongated groove 44. Antifriction bearing means is provided to facilitate the relative travel of the cylinder with respect to the piston, comprising an annular series of bearing balls 45 mounted in an axially elongated peripheral groove 47 in the neck 33, and a similar series of balls 49 arranged in an axially elongated slot 50 in the skirt portion of the piston. The grooves 47, 50 exceed the diameters of the balls 45, 49 therein by an amount which is at least equal to, and preferably somewhat greater than, the relative travel of the cylinder and piston during operation of the scale, so that the balls need not strike the end walls of the grooves during operation of the scale.

In the preferred construction shown, the cylinder 30 is bored or otherwise suitably formed upwardly from the lower end of the casing, the lower end of the cylinder being tightly closed by a plug-like head 52 held therein by securing threads as indicated at 54, and preferably also retained by a locking pin or the like, shown as a screw 55. The hook 12 is shown as formed with an integral stem 57 projecting upwardly through the plug 52 and into a chamber 59 formed by counterboring the upper end of the plug. A retaining split shear ring 60 is fitted in a peripheral groove 62 in the stem portion 57 and overlies a washer 64 fitted upon the stem within the counterbored chamber 59. An antifriction-type thrust bearing assembly 65 is interposed between the washer 64 and the lower head wall of the plug 52 and the stem and shear ring are further located and retained by an annular retaining collar 67 surrounding and overlying the shear ring 60, and in turn held by a snap ring 69 fitted in an appropriately positioned groove in the inner wall of the counterbored chamber 59. Stem 57 is sealed with respect to the bore 70 in the plug 52 by means of an O-ring 72. The washer 64 and locating ring 67 are freely rotatable in the chamber 59, and by virtue of the incorporation of the thrust bearing 65, the hook is thus easily rotatable, even when heavily loaded. The piston and connected supporting eye 10 are also easily rotatable with relation to the casing, even under load, by virtue of the provision of the bearing balls 45, 49.

A land portion 75 of maximum diameter at the lower extremity of the piston skirt carries the grooves for the sealing ring 44 and bearing balls 49. Above such land, the diameter of the skirt is somewhat reduced, as indicated at 77, to provide free fluid communication along the side wall of the piston between the head chamber above the piston and a lateral port 79 extending through a side wall portion 80 of the casing, which side wall portion is formed as a pad having a flat outer face 82 to which a dial frame 84 of generally annular form is adapted to be attached. The dial frame is secured, as by means of screws 85, and is sealed with respect to the pad face by means of a gasket 87. Although the dial assembly shown is relatively small in diameter, it will be appreciated that dials of larger diameter may be installed, and I preferably provide dial assemblies of different diameters to suit the service conditions to be encountered, and to properly space the graduations on the dial in accordance with the conditions of visibility, load capacity of the scale and the space available for use of the scale in the service for which it is designed. An annular cylindrical dial-supporting flange portion 89 of the dial frame is formed with an internal track portion 90 of cylindrical form, and the sheet metal dial 92 carries a plurality of ball bearing assemblies, generally designated 94, secured to the rear face of the dial near its rim, as by screw means 95, the outer races of the ball bearing assemblies riding on the track portion 90 and supporting the dial thereon in such manner that the dial is very easily rotatable. The dial is locked against escape in an axially forward direction by a snap ring 97. A segmental rack 99 toothed upon its outer peripheral surface is secured on the inner face to the dial 92 and meshes with a pinion 100 fast upon a shaft 102 rotatable by a tare adjusting knob 104 projecting accessibly from the dial frame. A lock screw 105 manipulatable by an integral knob 107 is engageable with the pinion shaft 102 to lock the latter and the dial in any desired position of adjustment.

The dial is swept by a pointer 109 secured to an axial shaft 110 which projects through a suitable axial hole 111 in the dial. The pointer is actuatable by a pressure gage assembly. While the construction of the pressure gage assembly is subject to variation, it is shown as comprising a conventional Bourdon gage mechanism. The Bourdon tube is designated 112 and communicates longitudinally with a conduit 114 coupled in fluid-tight relation to the port 79. The mechanism of the Bourdon gage assembly may be of any commercially suitable and available variety, and will require no detailed description, since it forms no part of my present invention. Such mechanism serves to connect the free end of the Bourdon tube to the pointer shaft 110 to rotate the latter and the pointer in conformity with variances of pressure communicated to the interior of the Bourdon tube through the conduit 114. Such mechanical connecting mechanism is generally designated 115. The entire Bourdon gage assembly is supported by a frame structure 117 rigidly attached to a mounting block 119 secured, as by screw means 120, to the pad face 82 within the enclosure formed by the annular dial frame.

It will be appreciated that the dial may be calibrated in pounds or other units of weight from zero to the desired capacity of the scale and that by rotating the dial in the manner previously indicated, the zero indication on the dial may be brought under the pointer at zero load or with a desired tare load. The increased pressure developed in the Bourdon gage is proportional to the load, so that the pointer furnishes an accurate designation of the load upon the scale. When all load is removed from the scale, the dial structure, Bourdon gage, and related laterally extending parts which project a substantial distance from the axis of the piston and stem portions represent an unbalanced load, tending to cock the casing with respect to the piston, and thereby to increase the friction between the cylinder and piston, so that without the provision of the antifriction balls 45, 49, there would be some tendency for the parts to stick at extremely light loads, or when the scale was unbalanced, so that the pointer would not return quickly and accurately to the exact zero position. The provision of the antifriction balls enables the piston and neck portions to be freely fitted, so that they are very easily slidable with respect to the casing and cylinder portions, and such lateral unbalanced loading imposed by the dial assembly is taken by the bearing balls, so that the tendency to stick is eliminated.

Upon initial assembly, the components within the casing 32 are completely assembled before the dial housing and gage structure are attached, and the initial conditioning of the mechanism is performed prior to such attachment of the dial and gage assembly. After the piston and plug portions, including the stem portions 15, 57 are assembled within the housing 32, the housing is supported upon a bench or table with the pad face 82 uppermost and horizontal. Hydraulic fluid is forced into the cylinder 30 through the port 79 until the system is completely full. This forces the piston 14 downwardly until the adjacent faces of the piston and plug 52 are in engagement with one another, and the O-rings 38, 42 are forced to the opposite outer ends of their respective grooves 40, 44, as shown. The balls 45, 49 may at such time be in any position, since the pressure is equalized upon both sides of such balls. The scale will not operate properly, however, if its initial position is one wherein the adjacent faces of the piston and plug are in engagement with one another. With the unit still resting on the bench, the supply tube is then uncoupled from the port 79, so that the fluid therein is exposed to atmosphere, the outer end portion 17 of the stem is grasped manually and pulled out slightly to create a gap between the adjacent faces of the plug and piston. Such gap is designated 125 in the drawing. Such outward movement of the piston causes the liquid to overflow and may roll the O-ring 38 slightly away from the top end wall of its groove 40, and may also roll the balls 45, 49 toward or into engagement with the lower end walls of their respective grooves 47, 50. Accurate operation will not be secured, however, if the balls 45 or 49 are in engagement with the lower end wall in such initial position, and it is also desirable that the O-ring 38 be in engagement with the outer extremity of its groove, so that there can be no initial movement of such ring when a load is applied to the scale. A small low pressure or hand pump containing hydraulic fluid is accordingly again coupled to the port 79 and a small quantity of such fluid is carefully forced into the unit under very light pressure which is not sufficient to again force the piston inwardly to close the gap 125, but is sufficient to equalize the pressure around the balls and force fluid on both sides thereof, so that the balls are in a free intermediate position at such initial positioning of the piston and casing, and also to force the O-ring 38 axially outwardly to return it to the outer end of its groove 40, as shown. This establishes the initial or zero position of the piston and casing with a slight gap between the piston and the plug and with the balls and O-rings in desired positions. It will be observed that the positioning of the O-rings is such that they cannot be displaced by an increase of pressure within the system and the positioning of the bearing balls is such that they can travel freely without striking an end wall during loading and unloading of the scale. The relative travel of the piston and cylinder is so slight that the O-rings take up the travel in flexure and the balls do not again move into engagement with the walls of their grooves. Assembly of the dial and gage structure is then completed, while the unit remains in the same position upon the bench, and all fluid-containing parts are completely filled with air-free hydraulic liquid, so that the relationship of the parts established in the manner described is not disturbed.

In addition to the factors noted, it will be observed that the greatest proportion of the inherent weight of the scale mechanism constitutes the equivalent of a tare load mass, which assists greatly in bringing the pointer back to zero.

While it will be apparent that the embodiment of the invention herein disclosed will fulfill the objects above stated, it will be appreciated that the invention is susceptible to modification, variation and change without departing from the proper scope or fair meaning of the subjoined claims.

I claim:

1. In a hydraulic weighing scale, a piston, suspension means connectible to the piston from one end, a casing incorporating a cylinder portion slidably fitted over the piston, suspension means connectible to the casing in substantial axial alignment with the piston, said piston being of stepped formation and the casing having a head wall overhanging a stepped portion of the piston, resilient annular sealing gaskets engaging the piston and casing upon opposite sides of said last-mentioned stepped portion of the piston, and a cylinder portion between said stepped portion and the overhanging head wall defining a pressure chamber, said sealing gaskets being housed in peripheral grooves which are substantially longer in an axial direction than the gaskets and being arranged at the opposite outer ends of such grooves.

2. In a hydraulic weighing scale, a piston, suspension means connectible to the piston from one end, a casing incorporating a cylinder portion slidably fitted over the piston, suspension means connectible to the casing in substantially axial alignment with the piston, said piston being of stepped formation and the casing having a head wall overhanging a stepped portion of the piston, resilient annular sealing gaskets engaging the piston and casing upon opposite sides of said last-mentioned stepped portion of the piston, bearing balls engaging the piston and casing between said sealing gaskets, said bearing balls being housed in axially elongated peripheral grooves, and a cylinder portion between said stepped portion and the overhanging head wall defining a pressure chamber, said sealing gaskets being a toroidal form and housed in peripheral grooves which are substantially longer axially than the torus diameter of the gaskets and being arranged at the opposite outer ends of such grooves.

3. In a hydraulic weighing scale, a piston, suspension means connectible to the piston from one end, a casing incorporating a cylinder portion slidably fitted over the piston, suspension means connectible to the casing in substantially axial alignment with the piston, said piston being of stepped formation and the casing having a head wall overhanging a stepped portion of the piston, a plurality of resilient annular sealing gaskets sealingly interengaging longitudinally extending portions of the piston and casing and at least one of which is located upon each side of said last-mentioned stepped portion of the piston, said sealing gaskets being in the form of toroidal or O-rings, and a cylinder portion between said stepped portion and the overhanging head wall defining a pressure chamber, said sealing gaskets being housed in peripheral grooves which are substantially longer axially than the gaskets and arranged at the opposite outer ends of such grooves.

4. In a hydraulic weighing scale, a piston, suspension means connectible to the piston from one end, a casing incorporating a cylinder portion slidably fitted over a portion of the piston, suspension means connectible to the casing in substantially axial alignment with the piston, said piston being of stepped formation and the casing having a head wall overhanging a stepped part of the piston, resilient annular sealing gaskets engaging the piston and casing upon opposite sides of said last-mentioned stepped part of the piston, bearing balls engaging the piston and casing in axial spaced relationship with respect to each said sealing gasket and between the sealing gaskets, said bearing balls being housed in axially elongated peripheral grooves formed in one of said portions and of an axial length which exceeds the diameters of the balls by an amount which is at least equal to the relative travel of the cylinder and piston during operation of the scale, whereby the balls need not strike the end walls of their respective grooves during operation of the scale, and a part of said casing between said stepped part of the piston and the overhanging head wall defining a pressure chamber, said sealing gaskets being housed in peripheral grooves which are substantially longer axially than the gaskets and arranged at the opposite outer ends of such grooves.

5. The method of charging and conditioning a hydraulic weighing scale of the type having piston and casing portions limitedly movable with relation to one another and defining a pressure chamber therebetween and having toroidal gaskets housed in axially elongated grooves at opposite sides of the pressure chamber which comprises feeding liquid into the pressure chamber under substantial charging pressure to move the piston in the cylinder until the piston engages a predetermined stop, whereby both toroidal gaskets are forced outwardly into engagement with the end walls of their respective grooves, continuing such feeding of liquid until the system is completely filled and the piston is in engagement with such stop, interrupting such feeding and moving the piston slightly away from such stop whereby one of said gaskets tends to roll away from the end wall of its groove, and reapplying to the fluid a pressure less than said previously mentioned pressure to move such rolled gasket back toward its end wall without moving the piston into re-engagement with such stop.

6. The method of charging and conditioning a hydraulic weighing scale of the type having piston and casing portions limitedly movable with relation to one another and defining a pressure chamber therebetween and having toroidal gaskets housed in axially elongated grooves at opposite sides of the pressure chamber, and an annular series of bearing balls housed in axially elongated grooves on the inside of each said gasket, which comprises feeding liquid into the pressure chamber under substantial charging pressure to move the piston in the cylinder until the piston engages a predetermined stop, whereby both toroidal gaskets are forced outwardly into engagement with the end walls of their respective grooves, continuing such feeding of liquid until the system is completely filled and the piston is in engagement with such stop, interrupting such charging and moving the piston slightly away from such stop whereby one of said gaskets tends to roll away from the end wall of its groove, and reapplying to the fluid a pressure less than said previously mentioned charging pressure to move such rolled gasket back toward its end wall without moving the piston into re-engagement with said stop, said reapplied pressure substantially equalizing the pressure around the bearing balls to position the balls in a substantially intermediate position with respect to the end walls of their elongated grooves.

7. In a hydraulic weighing scale, casing structure defining a cylinder space, a piston freely reciprocable in said cylinder space and adapted for connection to a suspension structure, suspension means for attachment to the casing, anti-friction bearing means mounting said piston in said cylinder, abutment means in the casing, means adapted to permit said cylinder space to be filled with pressure fluid to constitute a pressure chamber with said piston spaced slightly apart from said abutment, and a plurality of sealing means operatively associated with said piston and cylinder, including axially movable sealing rings located at opposite ends of said pressure chamber and bodily outwardly movable away from one another in opposite directions in response to a pressure within said cylinder space and between said sealing rings which is lower than the pressure required to move said piston in said cylinder space, whereby to maintain an effective seal with the piston spaced from said abutment.

WILLIAM M. WISE.

References Cited in the file of this patent

UNITED STATES PATENTS

| Number | Name | Date |
|---|---|---|
| 1,631,890 | Redick | June 7, 1927 |
| 1,878,835 | Fleischmann et al. | Sept. 20, 1932 |
| 1,995,996 | Moore | Mar. 26, 1935 |
| 2,304,363 | Johansen | Dec. 8, 1942 |
| 2,521,248 | Parker | Sept. 5, 1950 |